United States Patent [19]

Shepherd

[11] Patent Number: 5,127,948
[45] Date of Patent: Jul. 7, 1992

[54] WATER-BASED CHEMICAL COMPOSITIONS

[75] Inventor: David W. Shepherd, Bristol, United Kingdom

[73] Assignee: EKA Nobel Landskrona AB, Landskrona, Sweden

[21] Appl. No.: 503,629

[22] Filed: Apr. 3, 1990

[30] Foreign Application Priority Data

Apr. 5, 1989 [GB] United Kingdom ............ 8907705

[51] Int. Cl.$^5$ ............................................. C09D 11/08
[52] U.S. Cl. ..................................................... 106/30
[58] Field of Search ............................................. 106/30

[56] References Cited

U.S. PATENT DOCUMENTS

| | | | |
|---|---|---|---|
| 3,884,707 | 5/1975 | Dick et al. | 106/24 |
| 4,163,001 | 7/1979 | Carumpalos et al. | 260/29.6 |
| 4,225,475 | 9/1980 | Carumpalos | 106/30 |
| 4,363,887 | 12/1982 | Leep | 523/402 |
| 4,954,556 | 9/1990 | Bull et al. | 524/378 |
| 4,966,628 | 10/1990 | Amon et al. | 106/30 |

FOREIGN PATENT DOCUMENTS 0042686 12/1981 European Pat. Off. .
0286219 5/1988 European Pat. Off. .

Primary Examiner—Margaret V. Einsmann
Attorney, Agent, or Firm—Frishauf, Holtz, Goodman & Woodward

[57] ABSTRACT

Water-based compositions which are usable in the formulation of inks, particularly for flexographic printing, containing an acrylic copolymer and a resin, rosin or rosin derivative, in the absence of any protein component. Rosin esters may also be used. A proportion of the acidity of the resin or resin derivative can be neutralised by a base such as ethanolamine to form a soap which disperses the rosin. The copolymer preferably has a glass transition temperature of 0° C. or lower.

22 Claims, No Drawings

WATER-BASED CHEMICAL COMPOSITIONS

BACKGROUND TO THE INVENTION

1. Field of the Invention

This invention relates to water-based chemical compositions and is concerned, in particular, with water-based inks and varnishes, such as are used in flexographic and gravure printing and other specialised printing and overprinting processes.

2. Description of Prior Art

There is a general need for compositions for such purposes which are essentially aqueous in nature, i.e. they are water-based instead of being based upon organic solvents. Important factors in this respect include the general expense of organic solvents, environmental pollution problems caused by the use of organic solvents, both during manufacture and in the use of solvent-based systems, and the increasing scope and effect of health and safety legislation. In addition to the important reasons, such as those just described, underlying the need for water-based alternatives to solvent-based compositions, new uses have been developed in recent times for water-based flexographic and gravure inks and overprint varnishes, for printing upon absorbent paper and other absorbent substrates such as board materials used in packaging. One particular need which is now generally recognised is the development of water-dispersible media, for application to impermeable substrates, with the same qualitative results as are attainable with conventional solvent-based systems, especially in relation to adhesion and to chemical and water resistance properties. Moreover, it is a purpose of this invention to provide water-based compositions which have improved properties as compared with known water-based ones, both as regards cost and technical effect. For instance, known water-based inks usually comprise acrylic polymers, ranging in cost from 1,600 to 4,000 per metric tonne, and such inks sometimes lack the desired degree of adhesiveness to certain substrates. Printing applications with water-based acrylic polymer-containing inks which produce less than ideal results include the use of flexible substrates, such as plastics sheets used in the manufacture of multicolour printed plastics bags and similar products. It has now been discovered that improved water-based chemical compositions having a very desirable and useful range of properties can be made by using dispersions of rosin and/or rosin derivatives as extenders for organic polymer-based aqueous compositions. The invention thus provides compositions which are eminently useful as inks for such special uses as in flexographic and gravure processes, which match or even improve upon the properties of known solvent-based compositions, which substantially reduce the disadvantageous effects of organic solvents and which significantly reduce costs, by replacing large proportions of the relatively expensive organic polymers used in such compositions, but without causing any lowering of qualitative properties and standards.

SUMMARY OF THE INVENTION

It is an object of the present invention to provide a water-based composition suitable for use as or in the formulation of an ink for flexographic printing.

It is a further object to provide such a composition suitable for use in the formulation of an ink for printing on impermeable substrates.

It is another object to provide a water-based composition which contains a polymer component having a low glass transition temperature and which is capable of being used as or in the formulation of a printing ink.

It is also an object to provide a composition as mentioned in the preceding paragraph which has a glass transition temperature of about 10° C. or less.

Another object of the invention is to provide an aqueous composition which contains no more surfactant than is contained in the aqueous resin or rosin and polymer dispersions from which the composition is made.

A further object of the invention is to provide an aqueous composition for use as or in formulation of an ink, the composition containing rosin or rosin derivative which has been partially converted into a soap which serves to stabilise a dispersion of the rosin or rosin derivative in the water of the composition.

Yet another object is to provide an ink or composition for formulation of an ink, in which there is a substantial absence of proteinaceous material.

A further object of the invention is to provide a composition for use as or in an ink, which does not contain any free amine.

Another object is to provide aqueous compositions containing polymers of low glass transition temperatures, with a view to providing inks suitable for flexographic printing on impermeable substrates.

Other objects are to provide compositions for use in or as inks for use in gravure printing and/or in printing on permeable substrates.

According to an aspect of this invention, a composition of matter for use as or in a water-based ink composition comprises an aqueous dispersion containing a polymer component comprising one or more acrylic copolymers and/or one or more polyurethanes and a resin or resin component comprising a rosin, a rosin derivative, a hydrocarbon resin, a polyamide resin or a mixture of one or more thereof, the composition being substantially free from any protein component, such as casein or another proteinaceous colloid. Water-based ink compositions of this invention advantageously also exclude amines, such as monoethanolamine, usually included in an aqueous acrylic-based ink in order to neutralise carboxylic acid groups present.

The composition will usually be formed from respective aqueous dispersions of the said two components, each of, for example, about 50% by weight solids content.

One preferred class of hydrocarbon resins which can be used is that consisting of hydrocarbon resins based on $C_5$ to $C_9$ hydrocarbons.

The rosin component used in the water-based compositions of this invention can, in general, incorporate all forms of rosin and rosin derivatives.

Rosin is a solid resinous material which occurs naturally in the oleoresin of pine trees. It is obtained from one of three main sources, namely the oleoresin exudate of living pine trees, the oleoresin contained in the aged stumps of pine trees and from the tall oil produced as a by-product in the kraft paper industry. In addition to cyclic terpene carboxylic acids, rosin also includes a small amount of nonacidic components.

A major constituent of rosin is abietic acid, which is a tricyclic doubly-unsaturated mono-carboxylic acid. Abietic acid undergoes Diels-Alder addition reactions with dienophiles. Rosin may therefore be reacted with dienophilic carboxylic acids and their derivatives, such as maleic acid, maleic anhydride and fumaric acid, and so forms tetracyclic polycarboxylic acids. This reaction between rosin and dienophiles is commonly termed "fortification" and the reaction product is commonly termed a "fortified" rosin. Fortified rosin dispersions are used as sizing compositions in the paper sizing industry. Rosin dispersions according to the present invention may be based upon rosin, a fortified rosin or a mixture of the two. It is also possible to employ fortified rosins which have been treated with formaldehyde in order to enhance their stability. Esterified or disproportionated rosins may also be used in the compositions of this invention. Esterified rosins are rosins which have been reacted with an alcohol, preferably a polyol such as glycerol, triethylene glycol or pentaerythritol. Disproportionated rosins are rosins which have been treated by a catalytic process in order to improve their stability to oxidation. Hydrogenated rosins may also be used, again to give improved stability to oxidation, as may ester derivatives of fortified, disproportioned and hydrogenated rosins.

The preferred rosins for use in the composition of this invention are stabilized rosins. Another preferred feature of the invention lies in the use of acrylic-modified rosins, in forming the compositions of the invention and in forming water-based inks incorporating such compositions. Rosins and rosin derivatives which have been reacted with phenolic resins, e.g. phenol-formaldehyde resins, are also suitable.

Mixtures of any of the resins, rosins and rosin derivatives mentioned above may be used in the compositions of this invention.

Another optional feature is the use of rosin dispersions in the form of a soap, which may be formed in situ by the neutralisation of a part of the total acidity of the rosin, again using either an organic or the inorganic base. Preferably, such procedures involve the neutralisation of an amount in the range from 1% to 10% and, more preferably, from 3% to 6%, of the total acidity of the rosin acids. This procedure does not result in the formation of a water-soluble rosin or rosin derivative but rather in the conversion of a proportion of the rosin or rosin derivative into the soap which then acts to form an aqueous dispersion of the rosin or rosin derivative which would otherwise neither dissolve nor disperse in water.

The relative amounts of polymer component and resin or rosin component contained in the compositions of the invention are preferably in the range of from 75:25 to 30:70, more preferably in the range of from 75:25 to 70:30, by weight.

Compositions according to the invention advantageously contain a wax emulsion, preferably in an amount of up to 10% by weight of the composition. Inclusion of a wax emulsion in this way can improve properties such as scuff resistance, water resistance and release properties. The incorporation of a wax emulsion is particularly advantageous when the composition is a clear overprint varnish.

The rosin dispersions may be formulated using any of the conventional techniques and ingredients known in the art, except that, for the purpose of this invention conventional stabilising agents, such as protective colloids, e.g. casein, are not included, i.e. the compositions are at least substantially free from proteinaceous colloids.

The compositions of the present invention are preferably ones suitable for use in the formulation of inks for use in flexographic printing processes. Compositions suitable for use in the formulation of other inks, for example for use in gravure printing processes where the totally different printing method and equipment necessitates the use of inks having entirely different properties from those to be used in flexographic printing, can however also be provided.

Compositions suitable for use in the formulation of flexographic printing inks advantageously contain acrylic copolymers having glass transition temperatures ($T_g$) of no higher than 10° C., preferably no higher than 0° C. and more preferably no higher than −10° C. Typical copolymers may have $T_g$ values in the range −20° to 10° C.

The absence from the compositions of the invention of significant amounts of protein components is of particular advantage in the formulation of flexographic printing inks where the cloudiness or opacity which such components would confer on the ink would be a significant drawback, particularly when printing onto a transparent substrate.

Similar considerations do not arise in connection with other formulations, for example for gravure printing, but the clarity of the compositions is nevertheless also of advantage in such cases.

It should be noted that the compositions of the present invention do not normally contain more surfactant than is employed in the step of formation of the resin or rosin emulsion and the polymer latex from which the composition will often be formed. Typical amounts of surfactant used are in the region of up to 5% by weight of the emulsion and up to 2% by weight of the latex, respectively. This typically results in a surfactant content of the composition of less than 6% by weight and normally of no more than 4% by weight of the combined amount of polymer and resin or rosin dispersion. Ink formulations based on such a compositions would typically also contain less than 6% by weight surfactant and preferably contain no more than 4% by weight surfactant, more preferably no more than 3% by weight.

The presence of only these small amounts of surfactant i the compositions leads to ink properties which are well-suited to flexographic printing.

The compositions of the present invention can be used in the formulation of varnishes and, by the inclusion of suitable organic or inorganic pigments and water, printing inks also.; Advantageously, the inks produced have an polymer component content of 10 to 40% by weight of the ink, more preferably 20 to 40% by weight and most preferably 35 to 40% by weight. The resin or rosin content of the ink is preferably 5 to 40% by weight, more preferably 5 to 25% by weight and most preferably 5 to 15% by weight. The amount of pigment typically ranges from 10 to 20% by weight of the ink, more preferably from 14 to 16% by weight.

Inks formulated from compositions according to the invention can give good results in printing processes, particularly flexographic processes, carried out on a wide range of polar and non-polar substrates, both absorbent and non-absorbent and including, for example, polyethylene, treated or untreated, polypropylene, MYLAR and various papers including graphic and art papers. The inks of the invention can give particularly good results when used in flexographic processes carried out on impermeable substrates. Very satisfactory results can also be obtained when printing on permeable substrates by flexographic processes.

It has also been discovered, in further developing the invention and evaluating the discoveries made in carrying out the experimental work upon which the invention is based, that certain polymers give unexpectedly better results when used in conjunction with one another. A number of examples of these polymer combinations are given below.

EXAMPLES

In order that the invention may b more fully understood and appreciated, a number of Examples are given below in which many different forms of water-based dispersions comprising one or more acrylic binders for use in inks and other polymer-containing compositions and one or more protein-free stabilised rosin or rosin derivative dispersions are made and evaluated. In the following, Examples 14 to 16, 22, 24, 25, 27, 66, 70 and 108 do not exhibit the desired properties and so are excluded from the invention; these Examples are given for comparison with the other Examples, many of which use compositions which are closely similar to the excluded Examples; all the other Examples give results which can be rated as satisfactory or better, thus indicating the notably detailed and precise differences which often distinguish the compositions of the invention from other polymer/rosin compositions.

In the following Examples, the amounts are given in parts by weight. Each composition comprises a polymer emulsion or solution and a rosin or rosin derivative dispersion, both water-based, and the compositions may also contain an amine, water and a solvent. The polymer emulsions and solutions and the rosin or rosin derivative dispersions each have a solids content of substantially 50% by weight and having surfactant contents of no more than 2% by weight and 5% by weight respectively. For simplicity, commercially-available components are identified in the Examples by letters; product names incorporating a registered trade mark are marked *

| Component | Type | Identity | Description | Supplier | Tg |
|---|---|---|---|---|---|
| A | polymer | *GLASCOL 86TX | acrylic binder | Allied Colloids | 35° C. |
| B | " | *GLASCOL LS20 | " | Allied Colloids | −5° C. |
| C | " | *JONCRYL 74 | " | Specialty Chemical | −16° C. |
| C¹ | " | *JONCRYL 61 | " | Specialty Chemical | 85° C. |
| D | " | *NEOCRYL A-1052 | " | Polyvinyl Chemie | 9° C. |
| E | " | *NEOREZ R970 | Polyurethane binder | Polyvinyl Chemie | |
| F | " | *NEOREZ R974 | Polyurethane binder | Polyvinyl Chemie | |
| G | " | *POLYSAR 6171 | acrylic latex | Polysar International | −7° C. |
| H | rosin | INKTAC 103 | rosin dispersion | Albright & Wilson | |
| J | " | INKTAC 128 | rosin dispersion | Albright & Wilson | |
| K | " | INKTAC TX | rosin dispersion | Albright & Wilson | |
| L | " | INKTAC 08 | rosin ester dispersion | Albright & Wilson | |
| M | " | INKTAC 52 | rosin ester dispersion | Albright & Wilson | |
| N | solvent | *DOWANOL DPnB | dipropylene-glycol-n-butyl ether | Dow Chemical | |
| P | " | RPDE | oxygenated methyl ester mixture | Orange Chemicals | |
| Q | amine | Monoethanolamine | — | — | |
| R | drying agent | isopropyl alcohol | — | — | |
| S | vehicle | water | — | — | |
| T | organic pigment | phthalocyanine blue | — | Many | |
| U | wax emulsion | paraffin wax | — | Norwegian Talc | |
| V | wax emulsion | polyethylene wax | — | Norwegian Talc | |
| W | wax emulsion | microcrystalline wax | — | Norwegian Talc | |

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Polymer | A37.4 | A27.4 | A25 | A25 | A25 | A7.5 | A7.5 | A7.5 | A7.5 | A7.5 | A7.5 | A7.5 | A7.5 | A7.5 |
| Rosin | L10 | H10 | L20 | H20 | L2.5 | H2.5 | L2.5 | H2.5 | H2.5 | H2.5 | J2.5 | J2.5 | J2.5 | K2.5 |
| Solvent | — | — | — | — | — | — | N0.2 | P0.2 | N0.2 | P0.2 | — | N0.2 | P0.2 | — |
| Other | — | — | — | — | — | — | — | — | — | — | — | — | — | — |

Example

-continued

|         | 15   | 16   | 17   | 18           | 19   | 20    | 21    | 22   | 23    | 24    | 25    | 26 | 27 | 28   | 29 | 30   |
|---------|------|------|------|--------------|------|-------|-------|------|-------|-------|-------|----|----|------|----|------|
| Polymer | A7.5 | A7.5 | E5.0 | (A5.5)(F2.5) | A7.5 | A30   | A50   | A50  | A60   | G30   | G30   | D6 | D6 | D6   | C6 | C2.5 |
| Rosin   | K2.5 | K2.5 | H5.0 | H2.5         | M2.5 | J20   | —     | K20  | H20   | J10   | H10   | H2 | J2 | H2   | J2 | J2.5 |
| Solvent | N0.2 | P0.2 | —    | —            | —    | —     | —     | —    | —     | —     | —     | —  | —  | —    | —  | —    |
| Other   | —    | —    | —    | —            | —    | (Q2)(S48) | (Q2)(S48) | Q2 S48 | Q1 S31.5 | Q2.5 S48 | Q1 S14.0 | —  | —  | Q0.2 | —  | —    |

Example

|         | 31 | 32 | 33 | 34 | 35 | 36 | 37 | 38 | 39 | 40 | 41 | 42 | 43   | 44   | 45   | 46        | 47        | 48        | 49        | 50        |
|---------|----|----|----|----|----|----|----|----|----|----|----|----|------|------|------|-----------|-----------|-----------|-----------|-----------|
| Polymer | C6 | D6 | B6 | A6 | C6 | D6 | E6 | B6 | A6 | C6 | B6 | A6 | C6   | D6   | C6   | A6        | C6        | D6        | B6        | A6        |
| Rosin   | J2 | J2 | J2 | J2 | H2 | H2 | H2 | H2 | L2 | L2 | L2 | L2 | J2   | J2   | J2   | J2        | H2        | H2        | H2        | H2        |
| Solvent | —  | —  | —  | —  | —  | —  | —  | —  | —  | —  | —  | —  | —    | —    | —    | —         | —         | —         | —         | —         |
| Other   | —  | —  | —  | —  | —  | —  | —  | —  | —  | —  | —  | —  | Q0.2 | Q0.2 | Q0.2 | Q0.2 S5   | Q0.2 S2.5 | Q0.2 S2.5 | Q0.2 S2.5 | Q0.2 S5   |

Example

|         | 51   | 52   | 53   | 54            | 55   | 56          | 57              | 58                 | 59                 | 60                    | 61                  | 62                  |
|---------|------|------|------|---------------|------|-------------|-----------------|--------------------|--------------------|-----------------------|---------------------|---------------------|
| Polymer | C6   | D6   | B6   | A6            | E70  | (D6)(E50)   | F50             | B28.5              | B28.5              | (A14.25)(C14.25)      | A14.25 D14.25       | B14.25 D14.25       |
| Rosin   | L2   | L2   | L2   | L2            | H30  | L50         | K50             | J9.5               | J9.5               | J9.5                  | J9.5                | J9.5                |
| Solvent | —    | —    | —    | —             | —    | —           | —               | —                  | —                  | —                     | —                   | —                   |
| Other   | Q0.2 | Q0.2 | Q0.2 | (Q0.2)(S2.5)  | —    | —           | Q1.5 R13.8 S25.5 | R13.8 S25.5        | R13.8 S25.5        | S25.5                 | S25.5               | R13.8 S25.5         |

Example

|         | 63            | 64         | 65         | 66    | 67         | 68         | 69         | 70          | 71                 | 72                 | 73         | 74         |
|---------|---------------|------------|------------|-------|------------|------------|------------|-------------|--------------------|--------------------|------------|------------|
| Polymer | B14.25 D14.25 | C7.2 D7.2  | B7.2 D7.2  | A7.2 D7.2 | C7.2 D7.2  | B7.2 D7.2  | A14.4      | A14.4       | B7.2 D7.2          | A9.0               | B9.0       | C9.0       |
| Rosin   | J9.5          | J4.75      | J4.75      | J4.75 | J4.75      | H4.75      | H4.75      | H4.75       | J4.75              | H3.0               | H3.0       | H3.0       |
| Solvent | —             | —          | —          | —     | —          | —          | —          | —           | —                  | —                  | —          | —          |
| Other   | S25.5         | R6.9 S12.75 | R6.9 S12.75 | R6.9 S14.0 | R6.9 S12.75 | R6.9 S12.75 | R6.9 S12.75 | Q0.4 R6.9 S12.75 | Q0.4 R6.9 S12.75 | R2.0 S3.0 T3.0 | R2.0 S3.0 T3.0 | R2.0 S3.0 T3.0 |

Example

|         | 75             | 76             | 75             | 78             | 79   | 80   | 81   | 82   | 83   | 84   | 85   | 86    | 87         | 88         | 89         |
|---------|----------------|----------------|----------------|----------------|------|------|------|------|------|------|------|-------|------------|------------|------------|
| Polymer | D9.0           | E9.0           | F9.0           | G9.0           | H21  | B21  | C21  | D21  | E21  | F21  | G21  | A14.4 | B14.4      | C14.4      | D14.4      |
| Rosin   | H3.0           | H3.0           | H3.0           | H3.0           | H7   | H7   | H7   | H7   | H7   | H7   | H7   | H4.75 | H4.75      | H4.75      | H4.75      |
| Solvent | —              | —              | —              | —              | —    | —    | —    | —    | —    | —    | —    | —     | —          | —          | —          |
| Other   | R2.0 S3.0 T3.0 | R2.0 S3.0 T3.0 | R2.0 S3.0 T3.0 | R2.0 S3.0 T3.0 | T12  | T12  | T12  | T12  | T12  | T12  | T12  | R2    | R2         | R2         | R2         |

Example

|         | 90    | 91    | 92    | 93    | 94    | 95    | 96    | 97    | 98    | 99    | 100         |
|---------|-------|-------|-------|-------|-------|-------|-------|-------|-------|-------|-------------|
| Polymer | E14.4 | F14.4 | G14.4 | A14.4 | B14.4 | C14.4 | D14.4 | E14.4 | F14.4 | G14.4 | C14.4       |
| Rosin   | H4.75 | H4.75 | H4.75 | H4.75 | H4.75 | H4.75 | H4.75 | H4.75 | H4.75 | H4.75 | H4.75       |
| Solvent | —     | —     | —     | —     | —     | —     | —     | —     | —     | —     | —           |
| Other   | R2    | R2    | R2    | R2 S12| R2 S12| R2 S12| R2 S12| R2 S12| R2 S12| R2 S12| R2 S12.75   |

Example

|         | 101          | 102          | 103          | 104          | 105          | 106          | 107          | 108        | 109        |
|---------|--------------|--------------|--------------|--------------|--------------|--------------|--------------|------------|------------|
| Polymer | C$^1$14.4    | C14.4        | C$^1$14.4    | C14.4        | C$^1$14.4    | C14.4        | C$^1$14.4    | D14.5      | D10.3      |
| Rosin   | H4.75        | H4.75        | H4.75        | H4.75        | H4.75        | H4.75        | H4.75        | —          | J4.2       |
| Solvent | —            | —            | —            | —            | —            | —            | —            | —          | —          |
| Other   | R2 S12.75    | R2 S12.75 U3.39 | R2 S12.75 U3.39 | R2 S12.75 V3.39 | R2 S12.75 V3.39 | R2 S12.75 W3.39 | R2 S12.75 W3.39 | R1.5 S4.4 T3.5 | R1.5 S4.4 T3.5 |

Except as noted below, all the films obtained by making up the above formulations of those of Examples 1 to 108 which illustrate the invention and applying them to plastics sheets were satisfactory or better. The results obtained indicated the following:

(1) The rosin acid dispersion H used in Ex. 2 gave a better film than the rosin ester dispersion L of Ex. 1;
(2) The addition of a coalescing agent (the solvent N or P) in Ex. 5 to 10 showed no improvement;
(3) Ex. 11 gave an excellent coating on polypropylene and polyester ("MYLAR" RTM) films;
(4) Ex. 14 to 16 were all unsatisfactory, due to the presence of casein in the rosins;
(5) The urethane polymers of Ex. 17 to 19 gave excellent films on treated polypropylene;
(6) An unsatisfactory opaque film was given by the casein-containing rosin K in Ex. 22;
(7) The films obtained with the Polysar acrylic polymer G in Ex. 24 and 25 were too soft;
(8) The choice of rosin can be critical; J in Ex. 27 gave an unsatisfactory result, although used with the same proportions of the same polymer D as in Ex. 26 and 28.
(9) Some formulations, e.g. Ex. 40–42 and 46, showed bloom on the film, which could be accepted for many uses;

(10) Some formulations gave films which were less than fully satisfactory as regards water sensitivity; for instance, Ex. 43 to 46 produced water sensitivities where those of Ex. 43 and Ex. 44 were equal and were better than that of Ex 46, although that of Ex. 45 was the best in this group; Ex. 47 and 48 showed better water sensitivity than Ex. 49 and 50; Ex. 51 to 54 showed fairly good results only, while the water resistance of Ex. 62 was especially good.

(11) Ex. 86 to 92 are examples of a stable let down varnish which had a shelf life in excess of 3 months and which was blended with water and pigment to give the inks of Ex. 93 to 99.

(12) Ex. 102 to 107 containing wax emulsions were particularly useful as overprinting varnishes.

(13) Ex. 109 gave better ink adhesion to polyolefin substrates than Ex. 108

(14) The ink composition of Ex. 108 was prepared by first forming a paste consisting of the pigment, isopropanol, 3 parts by weight of the water and 3.5 parts by weight of the Neocryl 1052 and then adding the balance of the water and the Neocryl 1052. The ink composition of Ex. 109 was made similarly except that 1.2 parts by weight of the Inktac 128 was included in the paste composition and the balance added with the water and Neocryl 1052. The ink of Ex. 109 was found to give much improved adhesion compound with that of Ex. 108 when applied to a polyolefin substrate. Ex. 108 is included for the purpose of this comparison.

General Examples

All formulations using the ingredients indicated can be advantageously made up as aqueous-based flexographic ink compositions, in the following amounts in parts by weight; General Example I illustrates formulations which include an amine, which is omitted from the formulations illustrated by General Example II. In all cases where the formulations were otherwise the same, the omission of an amine gave better results.

|  | I | II |
| --- | --- | --- |
| Polymer | 28.5 | 28.5 |
| Rosin (INKTAC) | 9.5 | 9.5 |
| Water | 25.5 | 25.5 |
| Monoethanolamine | 1.5 | — |
| Isopropyl alcohol | 13.8 | 13.8 |
|  | 78.8 | 77.3 |

Coating Results

The formulations of Examples 64 to 71 were coated on to polyolefin films at thicknesses of 6, 12 and 18 microns respectively. The 12- and 18-micron layers were obtained by repeating once and twice respectively a first coating step, all steps producing a 6 micron thick layer. The satisfactory films produced in this way clearly show that the ink formulations of these Examples according to the inventions are suitable for use in the overprinting of plastics films.

Film Clarity

All gave excellent clear films, except Ex. 66 which was bitty. This formulation was difficult to make, probably due to interaction between the 2 polymers A and D.

Water Sensitivity

Samples of the films were immersed in cold water and left to stand. All proved to be permanent and therefore water-resistant, except Ex. 70, where the coating became released form the film substrate after a number of hours. However, a polymer system, not containing rosin A, was released immediately from the film.

Such a polymer system is not recommended for use on polyolefin film substrate. However, this shows that the addition of a resin gives an unexpected and definite improvement in the adhesion of the system to polyolefin.

This indicates that cheaper polymer systems can be used where normally a more expensive one would be deemed necessary. This type of result opens another useful application for polymer systems using such polymers as A.

Tack

Samples of the films were subjected to pressure, to test the coated products for film tack and blocking.

A 2.25 kg weight was applied over an area of 20 sq cm for 10 mins over a laminate comprising the ink film sandwiched between 2 sheets of the polyolefin substrate. The films were then separated and examined for any defect, but despite the severity of this test, all were satisfactory.

Conclusions

These Examples demonstrate that it is possible to incorporate into an acrylic polymer a rosin dispersion, in which the resin phase component sometimes has an overall softening point which would normally be expected to give a tacky film, and yet a permanent water-resistant non-tacky film is produced.

I claim:

1. A composition for use as or in a water-based ink composition, comprising an aqueous dispersion of (a) a polymer component which is an acrylic copolymer having a glass transition temperature of about 10° C. or lower and (b) a resin or rosin component selected from the group consisting of rosin, disproportionated rosin, hydrogenated rosin, fortified rosin, esterified rosin, phenolic modified rosin and acrylic modified rosin, a hydrocarbon resin based on $C_5$ to $C_9$ hydrocarbons, a polyamide resin or a mixture of two or more thereof, the composition being substantially free from any protein component and the ratio of polymer component to resin or rosin component being 75:25 to 30:70 by weight.

2. The composition according to claim 1, in which the aqueous dispersion contains the hydrocarbon resin based on $C_5$ to $C_9$ hydrocarbons.

3. The composition according to claim 1, in which the resin or rosin component is the rosin, disproportionated rosin, hydrogenated rosin, fortified rosin, esterified rosin, phenolic modified rosin or acrylic modified rosin.

4. The composition according to claim 1, in which the resin or rosin component is the fortified rosin.

5. The composition according to claim 1, in which the resin or rosin component is the esterified rosin.

6. The composition according to claim 3, further containing an organic or inorganic base in an amount sufficient to neutralise from about 1% to 10% of the acidity of the resin or rosin compound, thereby to form a soap effective to disperse the resin or rosin component in the water of the composition.

7. A composition according to claim 6, in which the base is an amine.

8. A composition according to claim 7, in which the amine is present in an amount sufficient to neutralize from about 3% to about 6% of the acidity.

9. The composition according to claim 7, in which the amine is monoethanolamine.

10. The composition according to claim 1, containing a wax emulsion in an amount of up to about 10% by weight of the composition.

11. The composition according to claim 1, in which the glass transition temperature of the polymer component is about 0° C. or lower.

12. A composition according to claim 11, in which the glass transition temperature of the polymer component is about −10° C. or lower.

13. A composition according to claim 1, containing surfactant in an amount of no more than about 6% by weight, based on the combined amount of polymer component and resin or rosin dispersion.

14. A pigmented or unpigmented ink comprising a composition according to claim 1.

15. The ink according to claim 14, in which the amount of polymer component is in the range of from about 10% to about 40% by weight of the-ink.

16. The ink according to claim 15, in which the amount of polymer component is in the range of from about 20% to about 40% by weight of the ink.

17. The ink according to claim 16, in which the amount of polymer component is in the range of from about 35% to about 40% by weight of the ink.

18. The ink according to claim 14, in which the amount of resin or rosin component is in the range of from about 5% to about 40% by weight of the ink.

19. The ink according to claim 18, in which the amount of resin or rosin component is in the range of from about 5% to about 25% by weight of the ink.

20. The pigmented ink according to claim 14, containing pigment in an amount of from about 10% to about 20% by weight of ink.

21. The ink according to claim 20, containing pigment in an amount of from about 14% to about 16% by weight of ink.

22. The ink according to claim 14, containing surfactant in an amount of less than about 6% by weight of the ink.

* * * * *